US008650608B2

(12) United States Patent  
Ono et al.

(10) Patent No.: US 8,650,608 B2  
(45) Date of Patent: Feb. 11, 2014

(54) METHOD FOR MODEL BASED VERIFICATION OF SECURITY POLICIES FOR WEB SERVICE COMPOSITION

(75) Inventors: Kouichi Ono, Tokyo (JP); Yuhichi Nakumura, Yokohama (JP); Fumiko Satoh, Tokyo (JP); Takaaki Tateishi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 1503 days.

(21) Appl. No.: 11/623,371

(22) Filed: Jan. 16, 2007

(65) Prior Publication Data

US 2008/0172714 A1     Jul. 17, 2008

(51) Int. Cl.
| | |
|---|---|
| *G06F 17/00* | (2006.01) |
| *G06F 7/04* | (2006.01) |
| *G06F 15/16* | (2006.01) |
| *G06F 17/30* | (2006.01) |
| *G06F 9/00* | (2006.01) |
| *G06F 12/00* | (2006.01) |
| *G06F 12/14* | (2006.01) |
| *G06F 13/00* | (2006.01) |
| *H04L 29/06* | (2006.01) |
| *G11C 7/00* | (2006.01) |

(52) U.S. Cl.
USPC .................. 726/1; 726/9; 726/14; 726/19

(58) Field of Classification Search
USPC ............................ 726/1–5, 12, 14, 26–30, 34
See application file for complete search history.

(56) References Cited

U.S. PATENT DOCUMENTS

| 6,460,141 | B1 * | 10/2002 | Olden .............................. 726/4 |
| 2005/0182958 | A1 * | 8/2005 | Pham et al. ................... 713/200 |
| 2005/0273850 | A1 * | 12/2005 | Freund ............................ 726/14 |

OTHER PUBLICATIONS

Dennis Volpano et al.; "A Sound Type System for Secure Flow Analysis;" Journal of Computer Security; Jul. 1996; pp. 1-20.

* cited by examiner

*Primary Examiner* — Kambiz Zand
*Assistant Examiner* — Jahangir Kabir
(74) *Attorney, Agent, or Firm* — Cantor Colburn LLP; Vazken Alexanian

(57) ABSTRACT

A method for model based verification of security policies for web service composition. The method includes corresponding to a verification generated by an information flow analysis. The method further includes obtaining an abstracted security qualifier. The method proceeds by presenting the abstracted security qualifier to an application model. The abstracted security qualifier being presented to the application model as a security requirement. Subsequently, the method proceeds by farther including removing the data security requirement on data utilized in the service from the compliance rule. The method proceeds by processing flow in the application model, such processing being based upon the data security requirement. The method further includes verifying the consistency in response to the processing flow.

4 Claims, 21 Drawing Sheets

| Algorithm Suite | [Dig] | [Enc] | [Sym KW] | [Asym KW] | [Enc KD] | [Sig KD] | [Min SKL] |
|---|---|---|---|---|---|---|---|
| Basic256 | Sha1 | Aes256 | KwAes256 | KwRsaOaep | Psha1L192 | PSha1L192 | 256 |
| Basic 192 | Sha1 | Aes192 | KwAes192 | KwRsaOaep | Psha1L192 | PSha1L192 | 192 |
| Basic 128 | Sha1 | Aes128 | KwAes128 | KwRsaOaep | Psha1L128 | PSha1L128 | 128 |
| TripleDes | Sha1 | TripleDes | KwTripleDes | KwRsaOaep | Psha1L192 | PSha1L192 | 192 |
| Basic256Rsa15 | Sha1 | Aes256 | KwAes256 | KwRsa15 | Psha1L256 | PSha1L192 | 256 |
| Basic192Rsa15 | Sha1 | Aes192 | KwAes192 | KwRsa15 | Psha1L192 | PSha1L192 | 192 |
| Basic128Rsa15 | Sha1 | Aes128 | KwAes128 | KwRsa15 | Psha1L128 | PSha1L128 | 128 |
| TripleDesRsa15 | Sha1 | TripleDes | KwTripleDes | KwRsa15 | Psha1L192 | PSha1L192 | 192 |
| Basic256Sha256 | Sha256 | Aes256 | KwAes256 | KwRsaOaep | Psha1L256 | PSha1L192 | 256 |
| Basic192Sha256 | Sha256 | Aes192 | KwAes192 | KwRsaOaep | Psha1L192 | PSha1L192 | 192 |
| Basic128Sha256 | Sha256 | Aes128 | KwAes128 | KwRsaOaep | Psha1L128 | PSha1L128 | 128 |
| TripleDesSha256 | Sha256 | TripleDes | KwTripleDes | KwRsaOaep | Psha1L192 | PSha1L192 | 192 |
| Basic256Sha256Rsa15 | Sha256 | Aes256 | KwAes256 | KwRsa15 | Psha1L256 | PSha1L192 | 256 |
| Basic192Sha256Rsa15 | Sha256 | Aes192 | KwAes192 | KwRsa15 | Psha1L192 | PSha1L192 | 192 |
| Basic128Sha256Rsa15 | Sha256 | Aes128 | KwAes128 | KwRsa15 | Psha1L128 | PSha1L128 | 128 |
| TripleDesSha256Rsa15 | Sha256 | TripleDes | KwTripleDes | KwRsa15 | Psha1L192 | PSha1L192 | 192 |

[Security Policy 1: SP1]

```
<wsp:Policy>
 <wsp:ExactlyOne>
 <wsp:All>
   <sp:SymmetricBinding>
     <wsp:Policy>
       <wsp:ExactlyOne>
         <wsp:All>
           <sp:AlgorithmSuite>
             <wsp:Policy>
               <wsp:ExactlyOne>
                 <wsp:All>
                   <sp:Basic192Sha256/>
                 </wsp:All>
                 <wsp:ExactlyOne>
               </wsp:Policy>
           </sp:AlgorithmSuite>
           <sp:IncludeTimestamp/>
           <sp:ProtectTokens/>
           <sp:SupportingTokens>
           <wsp:Policy>
             <wsp:ExactlyOne>
               <wsp:All>
                 <sp:KerberosToken>...</KerberosToken>
```

FIGURE 7B

```
                <sp:SignedParts>
                <sp:Header/>
                <sp:Body/>
                </sp:SignedParts>
              </wsp:All>
            </wsp:ExactlyOne>
          </wsp:Policy>
        </sp:SupportingTokens>
      </wsp:All>
    </wsp:ExactlyOne>
  </wsp:Policy>
</sp:SymmetricBinding>
<sp:SignedParts>
<sp:Body/>
</sp:SignedParts>
<sp:EncryptedParts>
<sp:Body/>
</sp:EncryptedParts>
</wsp:All>
</wsp:ExactlyOne>
</wsp:Policy>
```

FIGURE 8A

[Security Policy 2: SP2]

```
<wsp:Policy>
  <wsp:ExactlyOne>
    <wsp:All>
      <sp:SymmetricBinding>
        <wsp:Policy>
          <wsp:ExactlyOne>
            <wsp:All>
              <sp:AlgorithmSuite>
                <wsp:Policy>
                  <wsp:ExactlyOne>
                    <wsp:All>
                      <sp:Basic192Sha256/>
                    </wsp:All>
```

FIGURE 8B

```
            </wsp:ExactlyOne>
          </wsp:Policy>
        </sp:AlgorithmSuite>
        <sp:IncludeTimestamp/>
        <sp:ProtectTokens/>
        <sp:SupportingTokens>
          <wsp:Policy>
            <wsp:ExactlyOne>
              <wsp:All>
                <sp:KerberosToken>...</sp:KerberosToken>
                <sp:SignedParts>
                  <sp:Header/>
                  <sp:Body/>
                </sp:SignedParts>
                <sp:EncryptedParts>
                  <sp:Header/>
                  <sp:Body/>
                </sp:EncryptedParts>
                <sp:AlgorithmSuite>
                  <wsp:Policy>
                    <wsp:ExactlyOne>
                      <wsp:All>
                        <sp:Basic256/>
                      </wsp:All>
                    </wsp:ExactlyOne>
                  </wsp:Policy>
                </sp:AlgorithmSuite>
              </wsp:All>
            </wsp:ExactlyOne>
          </wsp:Policy>
        </sp:SupportingTokens>
      </wsp:All>
    </wsp:ExactlyOne>
  </wsp:Policy>
</sp:SymmetricBinding>
<sp:SignedParts>
```

FIGURE 8C

<sp:Body/>

</sp:SignedParts>

<sp:EncryptedParts>

<sp:Body/>

</sp:EncryptedParts>

</wsp:All>

</wsp:ExactlyOne>

</wsp:Policy>

FIGURE 9A

[Security Policy 3: SP3]

```
<wsp:Policy>
  <wsp:ExactlyOne>
    <wsp:All>
      <sp:SymmetricBinding>
        <wsp:Policy>
          <wsp:ExactlyOne>
            <wsp:All>
              <sp:AlgorithmSuite>
                <wsp:Policy>
                  <wsp:ExactlyOne>
                    <wsp:All>
                      <sp:Basic256Sha256/>
                    </wsp:All>
                  </wsp:ExactlyOne>
                </wsp:Policy>
              </sp:AlgorithmSuite>
              <sp:IncludeTimestamp/>
              <sp:SupportingTokens>
                <wsp:Policy>
                  <wsp:ExactlyOne>
                    <wsp:All>
                      <sp:KerberosToken>...</sp:KerberosToken>
                      <sp:SignedParts>
                        <sp:Header/>
                        <sp:Body/>
                      </sp:SignedParts>
```

FIGURE 9B

```
<sp:EncryptedParts>
  <sp:Header/>
  <sp:Body/>
</sp:EncryptedParts>
<sp:AlgorithmSuite>
    <wsp:Policy>
        <wsp:ExactlyOne>
          <wsp:All>
            <sp:Basic192Sha256/>
          </wsp:All>
        </wsp:ExactlyOne>
      </wsp:Policy>
    </sp:AlgorithmSuite>
    </wsp:All>
   </wsp:ExactlyOne>
  </wsp:Policy>
 </sp:SupportingTokens>
   </wsp:All>
  </wsp:ExactlyOne>
 </wsp:Policy>
</sp:SymmetricBinding>
 <sp:SignedParts>
    <sp:Body/>
 </sp:SignedParts>
 <sp:EncryptedParts>
    <sp:Body/>
  </sp:EncryptedParts>
  </wsp:All>
 </wsp:ExactlyOne>
</wsp:Policy>
```

FIGURE 14

```xml
<?xml version="1.0"?>
<DataSecurityRequirment>
        <target class="Customer">
                <assertion type="MessageProtection">
                        <attribute type="Confidentiality">high</attribute>
                        <attribute type="Integrity">normal</attribute>
                </assertion>
        </target>
</DataSecurityRequirement>
```

METHOD FOR MODEL BASED VERIFICATION OF SECURITY POLICIES FOR WEB SERVICE COMPOSITION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates in general to a web service, and more particularly to a method to verity the consistency of the security policy of a web service.

2. Description of Background

When composing a web service by combining existing components/services, it is difficult to judge the possibility of a service composition. This is because the possibility of the composition cannot be decided simply by judging the consistency of each service function, rather the consistency of the non-functional characteristics has to be judged.

Thus, there is a need for a method that verifies the consistency of the security policy of each web service.

SUMMARY OF THE INVENTION

The shortcomings of the prior art are overcome and additional advantages are provided through the provision of a method for model-based verification of security policies for web service composition. The method includes corresponding to a verification generated by an information flow analysis. The method further includes obtaining an abstracted security qualifier. The method proceeds by presenting the abstracted security qualifier to an application model. The abstracted security qualifier is presented to the application model as a security requirement. Subsequently, die method proceeds by further including removing the data security requirement on data utilized in the service from the compliance rule. The method proceeds by processing flow in the application model, such processing being based upon the data security requirement. The method further includes verifying the consistency in response to the processing flow.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution for a method for model-based verification of security policies for a web service.

BRIEF DESCRIPTION OF THE DRAWINGS

The subject regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 6 illustrates one example of a message digest function in accordance with the disclosed method of FIG. 1;

FIGS. 7A and 7B illustrate one example of a security policy;

FIGS. 8A-8C illustrate another example of a security policy;

FIGS. 9A-9B illustrate another example of a security policy;

FIG. 14 illustrates another example of a security requirement;

Figure 1:
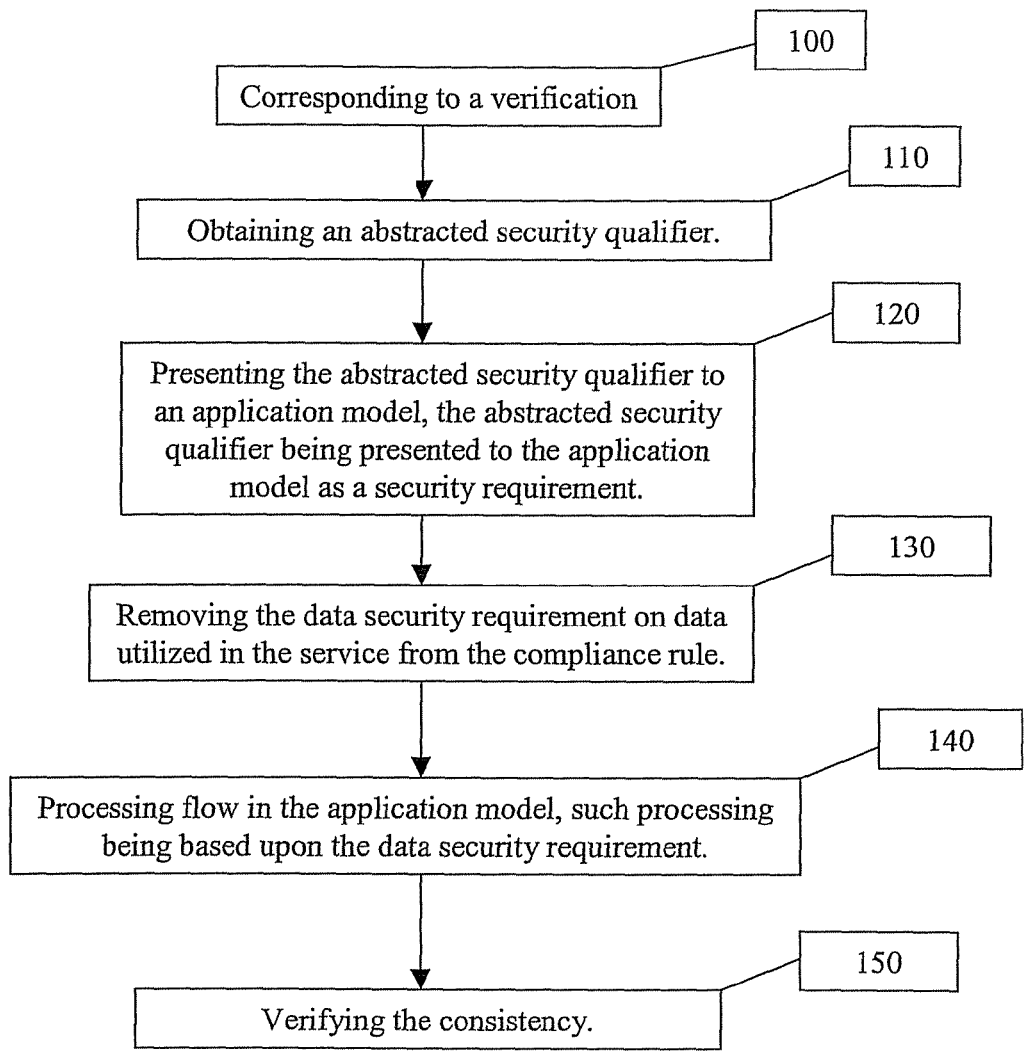
FIG. 1 illustrates one example of a method for model-based verification of security policies for a web service in accordance with the disclosed invention.

The detailed description explains an exemplary embodiment of the invention, together with advantages and features, by way of example with reference to the drawings.

DETAILED DESCRIPTION OF THE INVENTION

The disclosed method verifies security policies for web service composition based on several inputs. The inputs include a constraint on the order of the security level of the component of the security policy, a method for the abstraction of the security policy (a method for the ranking of the security policy), a security policy given to the function of each service component in advance and a process flow corresponding to each function. By using these inputs, the disclosed invention obtains the following outputs: a result of the consistency in the Confidentiality and Integrity of the security policy and in the case of an inconsistency, a portion that does not match in the process flow.

The constraint on the order of the security level of the component of the security policy is defined in advance based on elements such as the cryptographic algorithm and strength of signature, and the like according to the specification of the web services security policy language (WS-Security Policy), which is a description language of the security policy.

A security designer (who designs the system's security) defines the method for the abstraction of the security policy at the time of the development of the system. The abstraction method is a mapping, which relates the security policy to a security qualifier. The security qualifier is composed of security levels regarding the Confidentiality and Integrity. The abstraction method needs to meet the above constraint. The reason for this is because when obtaining each security qualifier from a plurality of security policies, by using the abstraction method, if the order relation of the security level holds between security policies according to the above constraint, the same order relation has to be maintained between corresponding security qualifiers.

For each function of each service component, the security policy is given in advance. That is, the security policy is inherent information for each service component.

A process flow is defined for each function prepared by combining service components, which an application processes. By using the input given when calling the function, the process flow sends back the output by data processing, conditional judgment, call of functions of other service components, and the like. In the disclosed invention, based on the security qualifier and process flow obtained by the abstraction, method, by using information flow analysis techniques, the consistency among security qualifiers is verified. The reason why the process flow is needed is that in the information flow analysis, it is necessary to analyze the data flow and control flow, and the process flow expresses them.

The assumption of the disclosed invention is that in the application model defining the service composition, for each component/service, the security policy is given. It is assumed that these security policies are appropriately defined by the engineer in advance. Or else, it is allowable to assume that they are generated by the method proposed by the prior art. The disclosed invention solves the problem by abstracting the given security policy to verify it on the application model.

Figure 2:
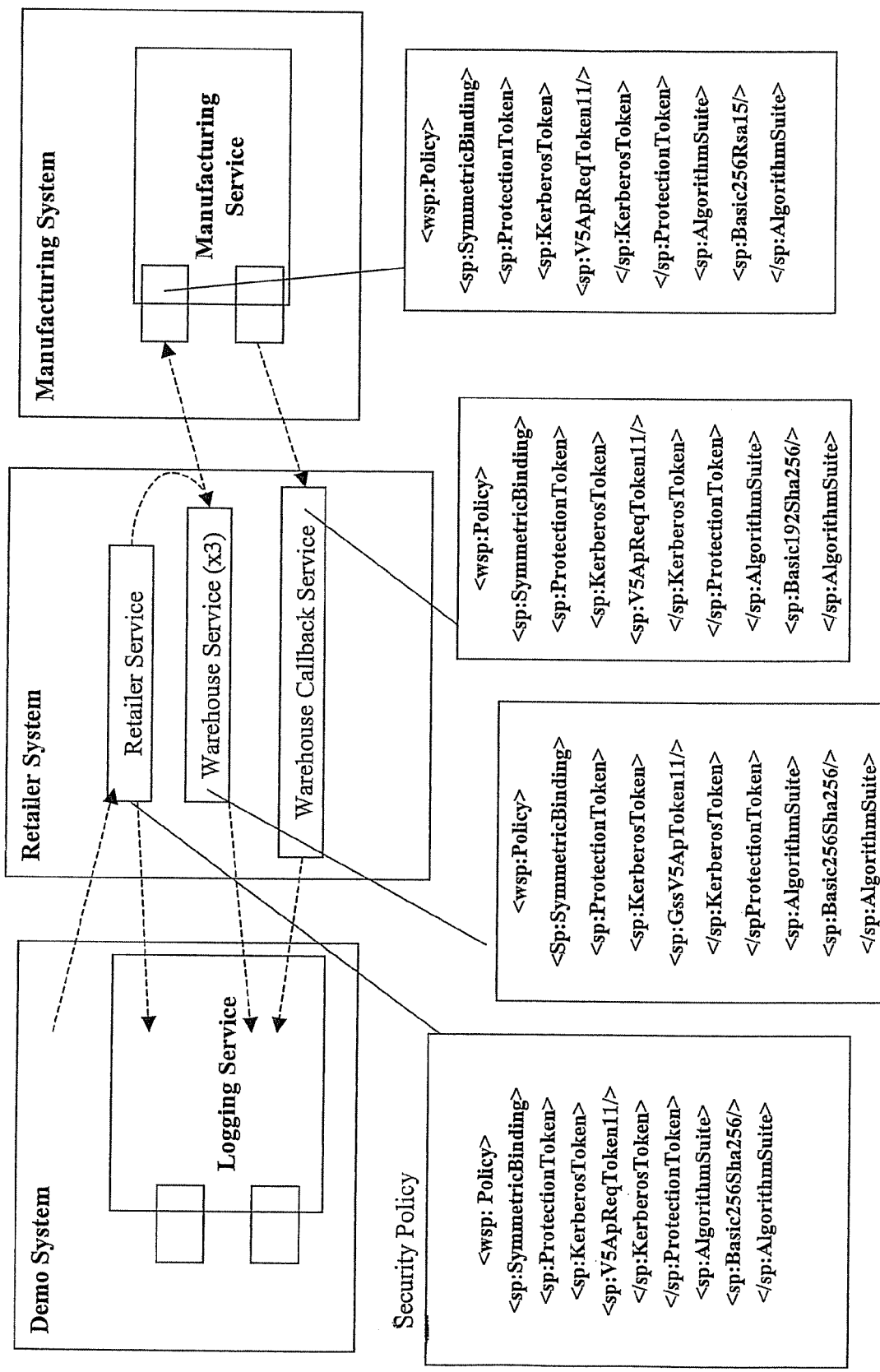
FIG. 2 illustrates one example of a web service and security policy.

Referring to FIG. 2, wherein an illustration of how security policies are given to each service in the supply chain management (SCM) composed of a plurality of web services is shown. These security policies show the policy on how to protect (message protection) the information (message) exchanged in the web service.

Figure 3:
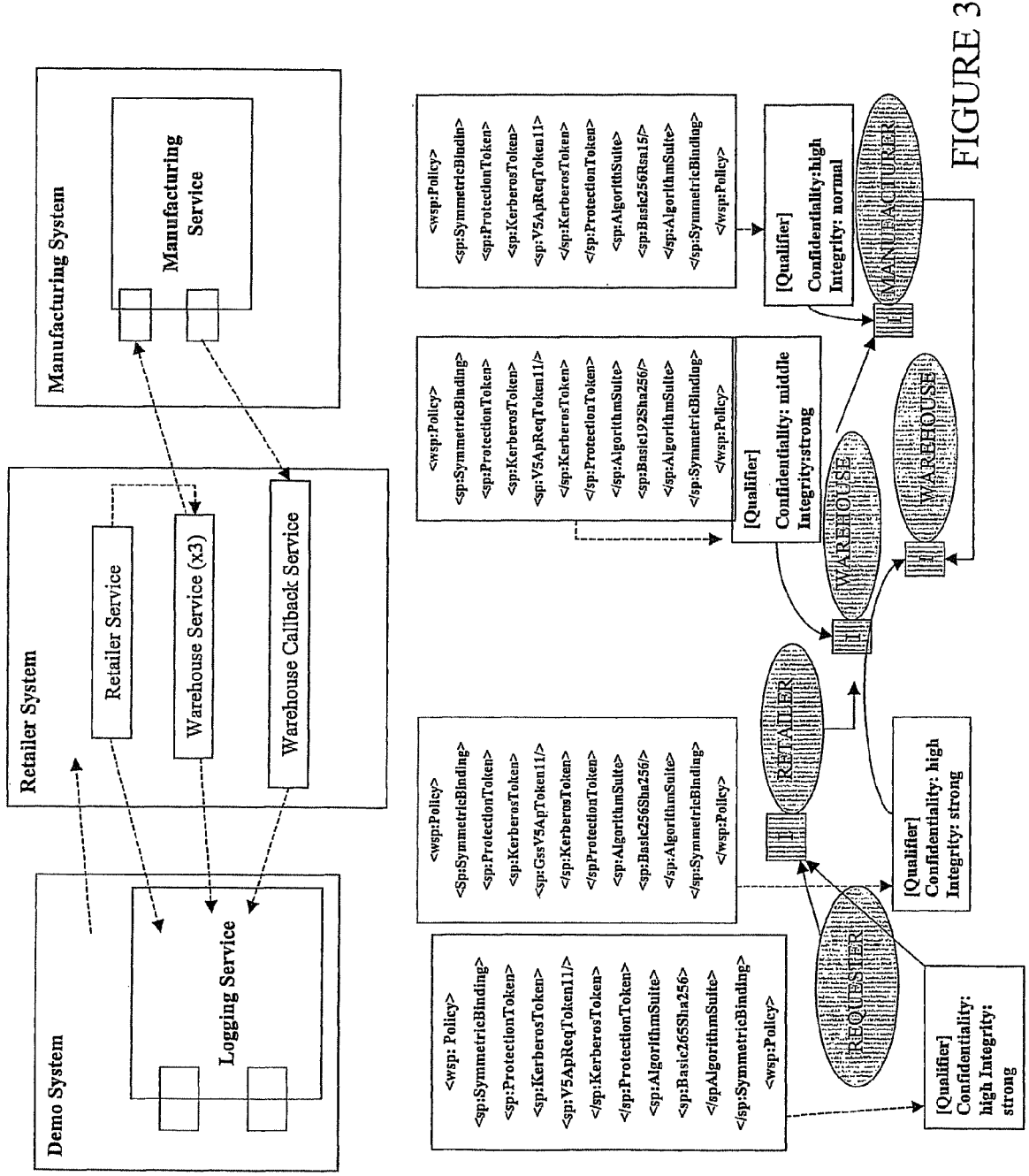
FIG. 3 illustrates one example of a security qualifier by abstraction of security policy.

Referring to FIG. 3, when information is being transmitted among services, there is a possibility that the policy on the protection of the transmitted information is not consistent among services, therefore, it is required to verify the consistency of the security policy.

However, it is not easy to analyze information transmissions among services and to verify the consistency among security policies. Since the security policy is expressed by a combination of detailed security assertions, it is not clearly expressed to what degree of the protection level each piece of information is treated. Therefore, it becomes unclear whether the protection level, treating the information in a service coincides with the protection level treated in the service of the destination or not, where the information is transmitted.

In order to solve the problem, in the disclosed method, a method is adopted to abstract the security policy to obtain the protection level, give it to the application model as the Security Qualifier, and verify it on the application model. The relation given to the Security Qualifier, which is an abstraction of the security policy, to the application model is shown in FIG. 3.

The application model is described by the Business Process Execution Language for Web Services ("BPEL") and the Unified Modeling Language ("UML") and the like, defining the process flow of the total service. The Security Qualifier given to the application model is composed of attributes (Confidentiality, Integrity) concerning the message protection. These attributes have attribute values representing the intensity of each protection, and the range of these attribute values is given so as to be the total order.

Further, in some systems using the service, rules that should be observed in the system regarding the utilization of information, what is called the Compliance Rule, is established. The disclosed invention also uses the Compliance Rule when verifying. Based on rules to be observed on information treated in the system, security requirement/policy for data exchanged in the service is taken out from the Compliance Rule to be used for the verification.

Figure 4:
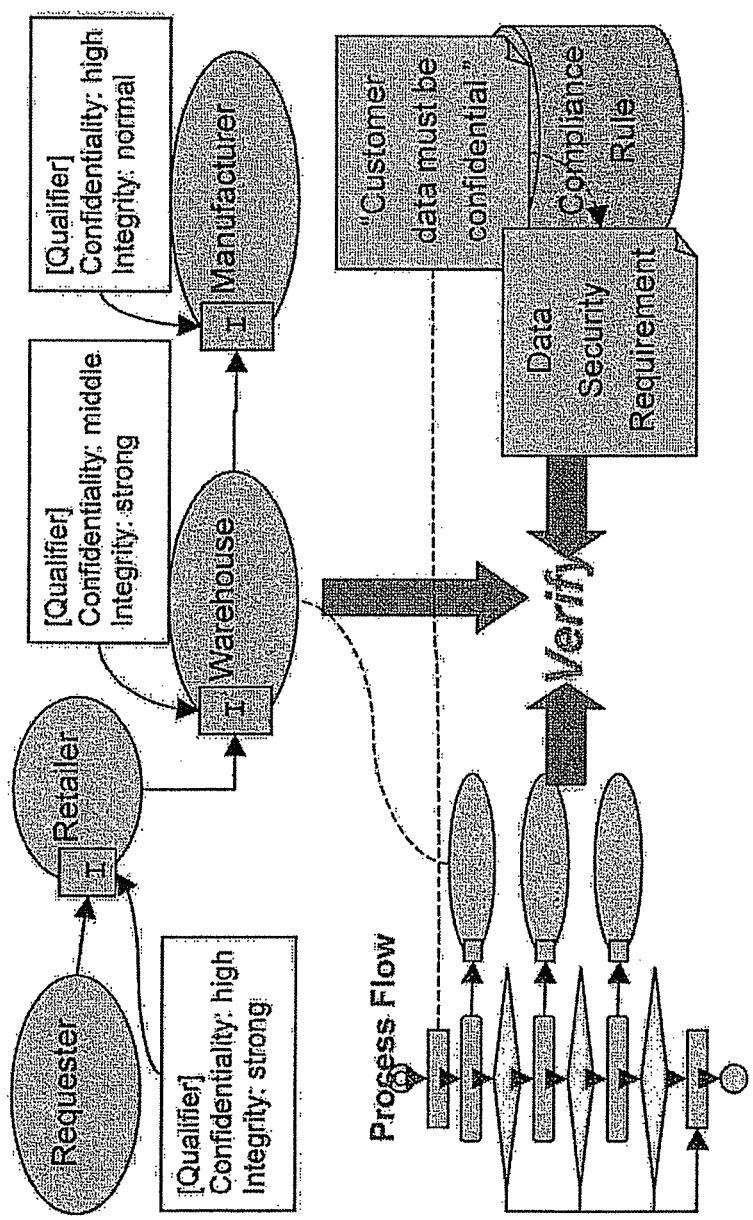
FIG. 4 illustrates one example of the relation among the Security Qualifier, process flow, and Compliance Rule in accordance with the disclosed method.
Figure 5:
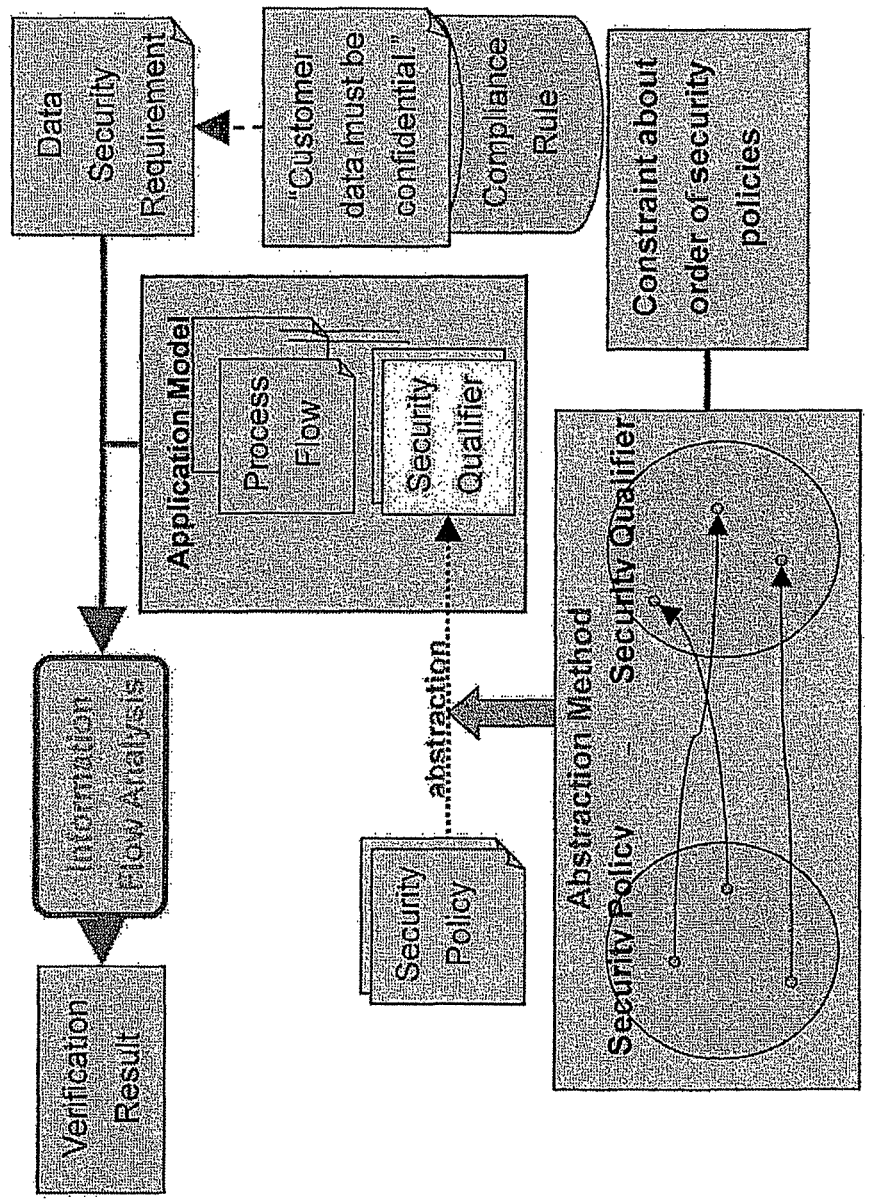
FIG. 5 illustrates one example of a total system in accordance with the disclosed method of FIG. 1.

Referring to FIG. 4, wherein the relationship among the Security Qualifier, process flow and Compliance Rule are shown. Referring to FIG. 5, the total system is shown.

With the method disclosed in FIG. 1, the verification of the consistency by the abstraction of the security policy is performed.

FIG. 1 illustrates a method for model-based verification of security policies for a web service composition. At step 100, correspondence to the verification by an information flow analysis in the system structure takes place. At step 110, an abstracted Security Qualifier is obtained. The Security Qualifier is abstracted from a security policy on a message protection member. The Security Qualifier is abstracted for each component, and each service.

At step 120, the abstracted Security Qualifier is presented to an application model. The abstracted Security Qualifier is presented to the application model as a security requirement. At step 130, the data security requirement is removed on data utilised in the service from the Compliance Rule.

At step 130, the flow in the application model is processed, such processing being based upon the data security requirement. Then, at step 140, the consistency is verified.

In a method (service composition) to compose a needed web service through a combination of existing components and services, since each component/service is independently defined to each other, it is necessary to judge whether they can be composed or not. In order to judge the possibility of the composition, it is not enough to verify the consistency of each function, but the verification of the consistency regarding the non-functional characteristics is also required. With the disclosed invention, the consistency of the security policy in the message protection of each web service is verified as the non-functional characteristics.

The disclosed method gives the security requirement obtained by abstracting the security policy to the model element as the Security Qualifier to follow the process flow and judge the consistency based on the security requirement on data led by the Compliance Rule.

It is assumed that these security policies are defined in advance, however, from the method proposed by the prior art, it is allowable to assume that the Security Qualifier generates it.

With regard to verifying the consistency of the security requirement of the program level, the method for the information flow analysis is shown in the prior art. The information flow analysis is a technique to analyze whether the program has an information flow to leak the information, which should be concealed. Especially, the confidentiality of information is considered as a security type, and a technique to analyze the information flow by a type inference is described. The disclosed invention quotes these traditional techniques to verify the consistency of the security policy. However, with these traditional techniques, the consistency of the security policy cannot be verified. The disclosure differs in that by obtaining the Security Qualifier, by which the security policy is abstracted, the verification is performed while quoting these traditional techniques. Further, the information flow analysis by the type inference, which is the traditional technique, analyzes by modeling the security type expressing the confidentiality for each variable in the program. So it is similar in that the present invention analyzes by giving an argument of each operation, of the service of the security requirement on the Confidentiality and Integrity. However, in the present invention, it is assumed that the security requirement is given not only to each argument, but also to data utilized in the service. Thus, the Compliance Rule such as "Customer information has to be encrypted by a high intensity code when being exchanged among any services" comes to be possible to be considered in the verification.

Embodiments of the invention judge the consistency according to the following procedure. Determine a method for the abstraction from the security policy to the security requirement, grant the security requirement to the application model, derive the security requirement on data from the Compliance Rule and verify the consistency among security requirements.

With the disclosed method, as for the description language of the security policy, a web services security policy (WS-Security Policy; WS-SP) is assumed. Based on the security policy described by the WS-Security Policy, obtain the security requirement abstracted therefrom, and give it to the application model as the Security Qualifier. In this disclosure, it is assumed that an expert on the security appropriately specifies the method for abstracting the security policy as a security designer. However, the method for abstracting the security policy has to be defined so as to fulfill the following constraints.

The Security Qualifier, which abstracted the security policy, is intended to express the intensity of the protection on the Confidentiality and Integrity. In the description, by the WS-Security Policy, an expression related to the intensity of the protection is as follows. In addition, the Integrity and Confidentiality at the back of each expression signifies which message protection requirement the expression is related to.

|  | confidentiality | integrity |
|---|---|---|
| <sp:AlgorithmSuite> | o | o |
| <sp:IncludeTimestamp> | x | o |
| <sp:EncryptSignature> | x | o |
| <sp:ProtectTokens> | x | o |
| <sp:OnlySignEntireHeadersAndBody> | x | o |
| <sp:SupportingTokens> | o | o |
| <sp:SignedSupportingTokens> | o | o |
| <sp:EndorsingSupportingTokens> | o | o |
| <sp:SignedEndorsingSupportingTokens> | o | o |

To an AlgorithmSuite, a name is given to express the combination of algorithms to be used in the encryption/signature. Names that can be specified as the AlgorithmSuite are as follows: Basic 192, Basic128, TipleDES, Basic256Rsa15, Basic192Rsa15, Basic128Rsa15, TripleDesRsa15, Basic256Sha256, Basic192Sha256, Basic128Sha256, TripleDesSha256, Basic256Sha256Rsa15, Basic128Sha256Rsa15, and TripleDesSha256Rsa15.

Referring to FIG. 6, these AlgorithmSuites show the combination of a Message Digest Function/Dig, Encryption/Enc, Symmetric Key Wrap/Sym KW, Asymmetric Key Wrap/Asym KW, Encryption Key Derivation/Enc KD, Signature Key Derivation/Sig KD, and Minimum Symmetric Key Length/Min SKL.

With the abstraction, among these combinations, as for those directly related, to the intensity of the message protection, the Message Digest Function, Key Wrap, and Encryption is related to the Confidentiality, and the Key Wrap being related to both the Integrity and Confidentiality. However, when in the <wsp:Policy> where the AlgorithmSuite is specified, <sp:SignedParts> or <sp:SignedElements> is not specified, since the signature by the AlgorithmSuite is not performed, the intensity of the Message Digest Function of the AlgorithmSuite has nothing to do with the Integrity. In the same way, when in the <wsp:Policy> where the AlgorithmSuite is specified, <sp:EncryptedParts> or, <sp:EncryptedElements> is not specified, since the encryption by the AlgorithmSuite is not performed, the intensity of the encryption of the AlgorithmSuite has nothing to do with the Confidentiality.

As for the Message Digest Function, two kinds, Sha1 (SHA-1) and Sha256 (SHA-156), can be specified. Of the two, the intensity of the Sha256 is higher than that of the Sha1. Consequently, regarding the integrity, the following order relations exists.

Basic256=Basic192=Basic128=TripleDes
=Basic256Rsa15=Basic192Rsa15=Basic128Rsa=15=TripleDesRsa15
<Basic256Sha256=Basic192Sha256=Basic128Sha256=TripleDesSha256
=Basic256Sha256Rsa15=Basic192Sha256Rsa15=Basic128Sha256Rsa15
=TripleDesSha256Rsa15

With regard to the Key Wrap, in the case of the object key, KwAes256 (AES-256), KwAes192 (AES-192), KwAes128 (AES-128), and KwTripleDes (3DES) can be specified as for the key encryption key. Of the four, the intensity becomes higher in the order of KwAes256, KwAes192, KwAes128, and KwTripleDes. Accordingly, regarding the Integrity and Confidentiality of the message exchange using the object key, the following order relation exists.

Basic256=Basic256Rsa15=BasicSha256=Basic256Sha256Rsa15
 ≥ <Basic192=Basic192Rsa15=Basic192Sha256=Basic192Sha256Rsa15
 ≥ <Basic128=Basic128Rsa15=Basic128Sha256=Basic128Sha256Rsa15
  <≥TripleDes=TripleDesRsa15=TripleDesSha256=TripleDesSha256Rsa15

Further, in the case of an asymmetrical, key, KwRsaOaep (RSA-OAEP) and KwRsa15 (RAS-1.5) can be specified as the key encryption key. Of the two, the intensity becomes higher in the order of KwRsaOaep and KwRsa15. Accordingly, regarding the Integrity and Confidentiality of the message exchange using the asymmetrical key, the following order relation exists.

Basic256=Basic192=Basic128=TripleDes
=Basic256Sha2S6=Basic192Sha256=Basic128Sha256=TripleDesSha256
 ≥ <Basic256Rsa15=Basic192Rsa15=Basic128Rsa15=TripleDesRsa15
 =Basic256Sha256Rsa15=Basic192Sha256Rsa15=Basic128Sha256Rsa15
 =TripleDesSha256Rsa15

As for the code, Aes256 (AES-256), Aes192 (AES-192), Aes128 (ABS-128, and TripleDes (3 DES) can be specified. Of the four, the intensity becomes higher in the order of Aes256, Aes192, Aes128, and TripleDes. Consequently, regarding the Confidentiality, the following order relation exists.

```
Basic256=Basic256Rsa15=Basic256Sha256=Basic256Sha256Rsa15
    ≥ <Basic192=Basic192Rsa15=Basic192Sha256=Basic192Sha256Rsa15
    ≥ <Basic128=Basic128Rsa15=Basic128Sha256=Basic128Sha256Rsa15
    ≥<TripleDes=TripleDesRsa15=TripleDesSha256=TripleDesSha256Rsa15
```

With regard to <sp:IncludeTimestamp/>, <sp:ProtectTokens/>, <sp:EncryptSignature/>, and <sp:OnlySignEntireHeadersAndBody/> when being specified, the intensity of the protection becomes higher regarding the Integrity, respectively. Consequently, regarding the Integrity, the following order relations exist.

```
Without <sp:IncludeTimestamp />, with <sp:IncludeTimestamp />.
Without <sp:ProtectTokens />, with <sp:ProtectTokens />.
Without <sp:EncryptSignature />, with <sp:EncryptSignature />.
Without <sp:OnlySignEntireHeadersAndBody />, with
<sp:OnlySignEntireHeadersAndBody />.
```

In addition, since there is no mutual order relation among these security assertions, for example, for the security policy with specified <sp:IncludeTimestamp/> and not specified <sp:ProtectTokens/> and the security policy with not specified <sp:IncludeTimestamp/> and specified <sp:ProtectTokens/>, the order is not restricted. That is, it is not possible to decide that either of them has a higher Integrity, the Security Designer can freely decide.

<sp:SupportinTokens/>, <sp:SignedSupportingTokens>, <Sp:EndorsingSupportingTokens>, and <sp:SignedEndorsingSupportingTokens> indicate the message protection by another token in addition to the above message protection. Thus, the intensity of the above message protection is further enhanced. For the AlgorithmSuite specified among the <wsp:Policy>, which is given to the security assertion of the supporting token, the intensity of the Integrity and Confidentiality is enhanced. In addition, when the AlgorithmSuite is not specified, a main AlgorithmSuite is employed. However, when neither <sp:SignedParts> nor <sp:SignedElements> is specified in the <wsp:Policy>, since signing by the AlgorithmSuite is not conducted, the intensity of a message digest function of the AlgorithmSuite has nothing to do with the Integrity. Similarly, when neither <sp:EncryptedParts> nor <sp:EncryptedElements> is specified in the <wsp:Policy>, since the encryption by the AlgorithmSuite is not performed, the intensity of the code of the AlgorithmSuite has nothing to do with the Confidentiality. The digest function and intensity of the code of the AlgorithmSuite will be given as stated above.

Moreover, as for <sp:EndorsingSupportingTokens> and <sp:SignedEndorsingSupportingTokens>, since the main signature is further signed, the intensity of the protection regarding the Integrity becomes higher. Further, when <sp:SignedSupportingTokens> and <sp:SignedEndorsingSupportingTokens> are used for the signature, since the token is signed by the main signature key, the intensity of the protection for the Integrity becomes higher. Consequently, regarding the Integrity, the following order relations exist.

```
Without <sp:EndorsingSupportingTokens> or
<sp:SignedEndorsingSupportingTokens>
With <sp:EndorsingSupportingTokens> or
<sp:SignedEndorsingSupportingTokens>
Without<sp:SignedSupportingTokens>
or<sp:SignedEndorsingSupportingTokens>
With<sp:SignedSupportingTokens>or<sp:SignedEndorsingSupportingTokens>
and with <sp:SignedParts> or<sp:SignedElements>
```

The order relation regarding the Integrity and Confidentiality of the security policy, which is described by combining these security assertions, is subject to the constraint of the order relation regarding the Integrity and Confidentiality of each, security assertion. That is, when there are two security policies, SP1 and SP2, and each security assertion being AS1i (i=1 . . . m), SA2j (j=1 . . . n), regarding the Integrity and Confidentiality, order relations of the security policy are given as follows, respectively.

```
SP1<SP2 iff ∀i:1..m∃j:1..n[SA1i<SA2j]
SP1<SP2 iff ∀i:1..m∃j:1..n[SA1i=SA2j]
    ∀ j:1..n∃i:1..m[SA1i=SA2j]
```

In addition, for security assertions having no relation to the intensity of the protection with each other, SA1i=SA2j. Further, the constraint on the order regarding the Integrity and that of on the order regarding the Confidentiality are independent.

From this definition, the order relation would not always be decided among arbitrary security policies. That is, the intensity of the protection expressed by the security policy becomes a constraint relation of a partial order. The Security Designer can specify the order among security policies having no constraint on the order.

Referring to FIGS. 7A-7B, 8A-8C and 9A-9B, after observing the constraint on the protection intensity defined like the above, the Security Designer has to define the method for the abstraction. For example, the three security policies shown in FIGS. 7A-7B, 8A-8C and 9A-9B are supposed to be given to each Web service used for the composition.

Then, according to the above-mentioned definition, the order of the Integrity and Confidentiality are subject to the following constraints. [Integrity] SP1>SP2 and SP1>SP3

However, there is no constraint on the order between SP2 and SP3. The reason why such an order is taken is as follows. In SP2, <sp:AlgorithmSuite> is added to <sp:SupportingTokens> of SP1. In addition, <sp:EncryptedParts> is added, though, there is no relation with the Integrity. In this AlgorithmSuite, <sp:Basic256> is specified. Its integrity is lower than <sp:Basic192Sha256/>, which is specified in the AlgorithmSuite of the original binding, consequently, SP1>SP2.

In SP3, the specification of the AlgorithmSuite of the binding is changed from <sp:Basic192Sha256/> of SP1 to <sp:Basic256Sha256/>. However, that has nothing to do with the Integrity. Further, <sp:AlgorithmSuite> is added to <sp:SupportingTokens>. In addition, <sp:EncryptedParts> is added, however, that has nothing to do with the Integrity. In this AlgorithmSuite, <sp:Basic192Sha256/> is specified. This is equal to <sp:Basic192Sha256/>, which is specified for AlgorithmSuite of the binding of SP1, so that that has also nothing to do with the Integrity, too. Further, <sp:ProtectToken> is deleted, which used to exist in the SP1, that has an influence on the Integrity, so that SP1>SP3.

The difference between SP2 and SP3 is that the AlgorithmSuite of the binding us changed from <sp:Basic192Sha256/> to <sp:Basic256Sha256/> (that has nothing to do with the Integrity), if there is <sp:ProtectTokens/> or not (this makes SP2 have a higher Integrity than SP3), and the AlgorithmSuite of <sp:SupportingTokens> is changed from <sp:Basic256/> to <sp:Basic192Sha256/> (this makes SP3 have a higher Integrity than SP2). Consequently, there is no order relation between SP2 and SP3.

Confidentiality: SP1<SP2, SP1<SP3, however, there is no constraint on the order between SP2 and SP3. The reason why such an order is taken is as follows.

In SP2, <sp:EncryptedParts> and <sp:AlgorithmSuite> are added to <sp:SupportingTokens> of SP1. In this AlgorithmSuite, <sp:Basic256/> is specified. Its Confidentiality is lower than <sp:Basic192Sha256/>, which, is specified in the AlgorithmSuite of the original binding, consequently SP1<SP2.

In SP3, the specification of the AlgorithmSuite of the binding is changed from <sp:Basic192Sha256/> of SP1 to <sp:Basic256Sha256/>, which makes the Confidentiality of SP3 higher than that of SP1. Further, <sp:EncryptedParts> and <sp:AlgorithmSuite> are added to <sp:SupportingTokens>. In this AlgorithmSuite, <sp:Basic192Sha256/> is specified. This is equal to <sp:Basic192Sha256/>, which is specified for AlgorithmSuite of the binding of SP1, so that this part does not affect the order of the Confidentiality. Further, <sp:ProtectTokens/> is deleted, which used to exist in the SP1, that does not affect the Confidentiality, too, so that SP1<SP3.

The difference between the SP2 and SP3 is that the AlgorithmSuite of the binding is changed from <sp:Basic192Sha256/> to <sp:Basic256Sha256/> (this makes SP3 have a higher Confidentiality than SP2), if there is <sp:ProtectTokens/> or not (this does not affect the order of the Confidentiality), and the AlgorithmSuite of <sp:SupportingTokens> is changed from <sp:Basic256/> to <sp:Basic192Sha256/, (this makes SP2 have a higher Confidentiality than SP3). Consequently, there is no order relation between SP2 and SP3.

According to the constraint, the Security Designer defines the method for the abstraction, that is, the entire order relations regarding the Integrity and Confidentiality. In this case, regarding the Integrity and Confidentiality, two order relations are possible as follows.
[Integrity] (strong, normal, poor)

SP1>SP2>SP3
SP1>SP3>SP2
[Confidentiality] (high, middle, low)
SP2>SP3>SP1
SP3>SP2>SP1

Here, it is supposed that it was decided as follows.

[Integrity]
SP1 (strong) >SP2 (normal) >SP3 (poor)
[Confidentiality]
SP2 (high) >SP3 (middle) >SP1 (low)

Here, the order relation is supposed to be defined as that which does not meet the constraint. For example, regarding the Integrity, SP3>SP1>SP2 is supposed to be defined. Because this meets one of the constraints SP1>SP2, however, this does not meet another constraint SP1>SP3, so that it can be routinely judged that it is not a correct method for abstraction.

Figure 10:
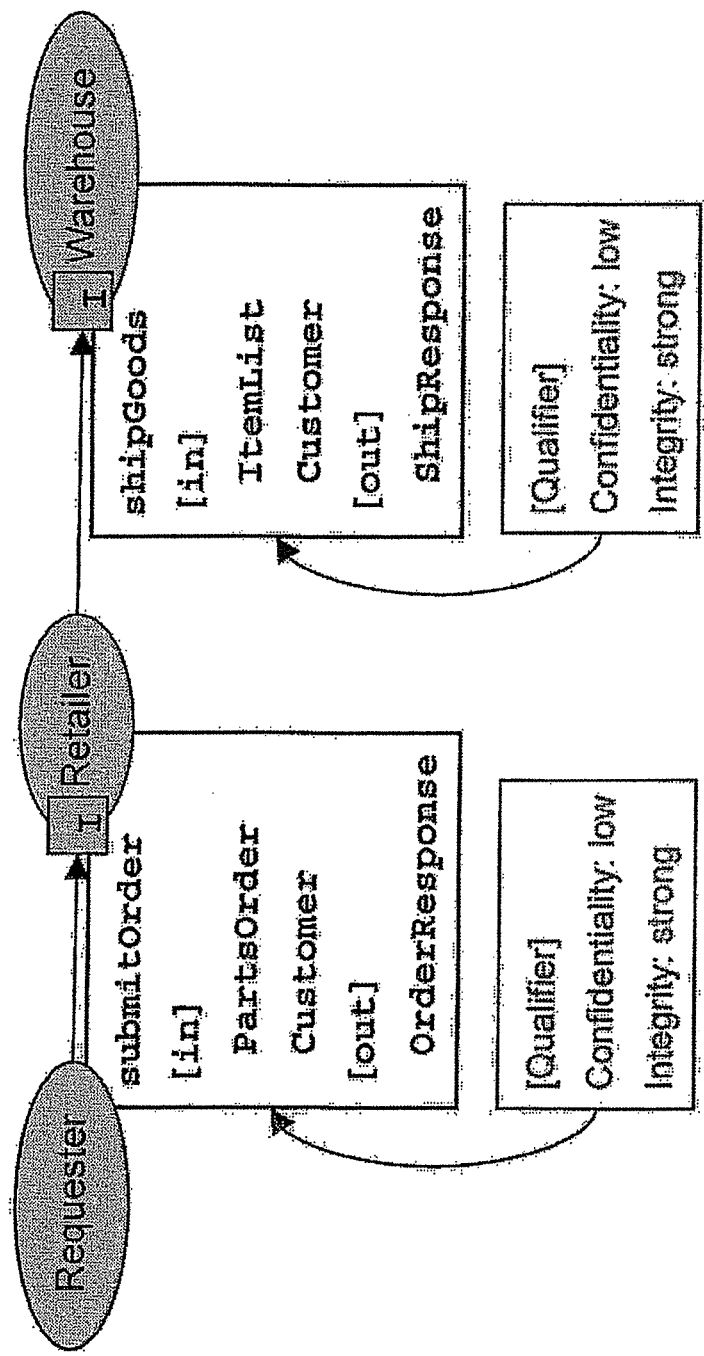
FIG. 10 illustrates one example of a model for supply chain management.

Giving Security Qualifier to Application Model: Referring to FIG. 10, a component/service model, which is given the security requirement (Security Qualifier), is expressed. Here, it is assumed that the Security Policy SP2 is given to interfaces of the Retailer and Warehouse. With regard, to a notation of the model, a component diagram of the UML and the Assembly Diagram, of the IBM WebSphere Integration Developer and the like can be employed.

In this model, the relation of three services (Requester, Retailer, and Warehouse) is described. While the Requester service calls the operation submitOrder of the Retailer service, the Retailer service call the shipGoods service of the Warehouse service. [I] represents the interface provided by the service and each operation is defined by this interface. The Security Qualifier is given, to the interface/operation/argument. When the Security Qualifier is given to the interface. It is considered to be equivalent when the Security Qualifier is given to all operation defined by the interface.

$$q(IF) \Leftrightarrow \forall op \in Operators(IF)[q(op)]$$

(q is the Security Qualifier, IF being the interface, and Operators (IF) being a set of operations defined by the IF).

When the Security Qualifier is given to a certain operation, it is considered to be equivalent when the Security Qualifier is given to ail arguments of the operation.

$$q(op) \Leftrightarrow \forall p \in Parameters(op)[q(p)]$$

(q is the Security Qualifier, op being the operation, and Parameters
(op) being a set of arguments of the operation op).

When the Security Qualifier is given to a certain interface/operation and at the same time, the Security Qualifier is given to the operation defined by the interface or the argument of the operation, more inner Security Qualifier is prioritized.

The meaning of each Security Qualifier is as follows. When the data substituted for the argument, to which the Security Qualifier is given, is exchanged through a communication channel, the Confidentiality and Integrity demonstrated to the Security Qualifier are required to be preserved. Accordingly, the call of the operation having the argument needs to be performed under a specified Confidentiality and Integrity. Further, when calling the operation of other services in the processing of the operation, in the case delivering the argument data, and giving an influence on the argument data, the calling needs to be performed to maintain the Confidentiality and Integrity specified by the Security Qualifier.

Figure 11:
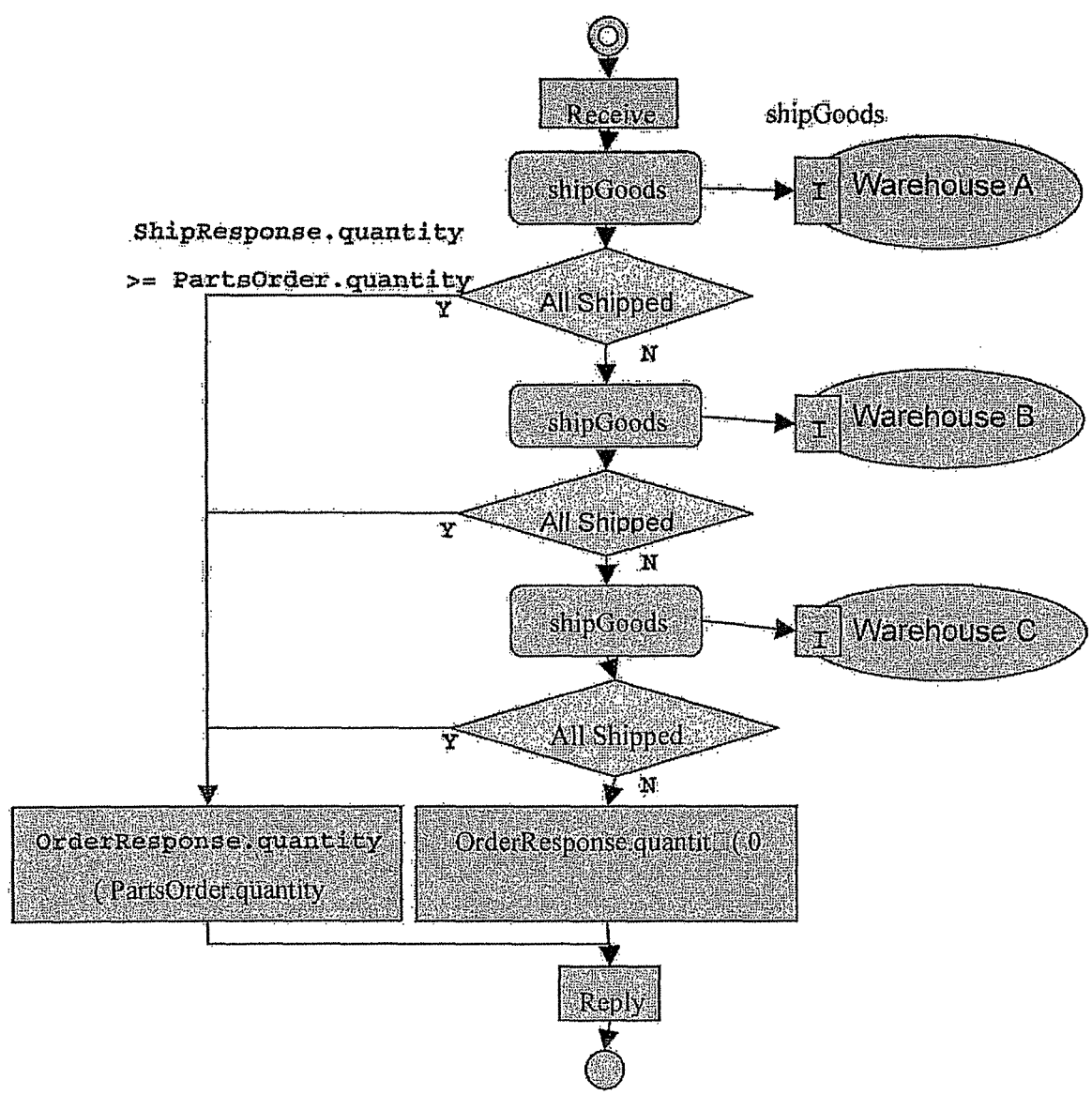
FIG. 11 illustrates one example of a process flow.

Referring to FIG. 11, a process flow of data flow/control flow expressing the processing of each is shown. For the notation of the flow, an activity diagram of the UML and BPEL (Business Process Execution Language for Web Services) can be employed.

This process flow expresses the flow of the processing when the operation submitOrder of the Retailer service is called. An order PartsOrder from an orderer Customer is received, an operation shipGoods of three Warehouse services A, B, and C are called, and a response OrderResponse capable of shipping is returned when having a stock equal to or more than the amount of the order, however, the OrderResponse with 0 is returned for each case when, the stock is not sufficient.

Security Requirement on Data Guided from Compliance Rule: The Security Qualifier may be given to a different portion, such as the interface/operation/argument, however, eventually it is treated as the requirement of the Confidentiality and Integrity when the data substituted for the argument is exchanged on the communication channel. Only giving the security requirement to the argument of the operation like that is not sufficient to define the security requirement of the total system. This is because the total service has to follow the Compliance Rule of the system utilizing the service. In the model verification, take out the security requirement for data from the Compliance Rule, and judge the consistency with, the Security Qualifier. For example, it is assumed that the Compliance Rule is given as follows.

Customer data must be treated with high confidentiality and high integrity. Customer data means the personal information about the customer. For example, personal name, postal addresses, call numbers, mail addresses, gender, birth date, age, and so on. Any message including customer data must be protected with high confidentiality and high integrity when it is transferred in the network. For data, encryption of the message, AES-256 must be used. For digital signature of the message, SHA-256 or a stronger function must be used, as the message digest function.

Figure 12:
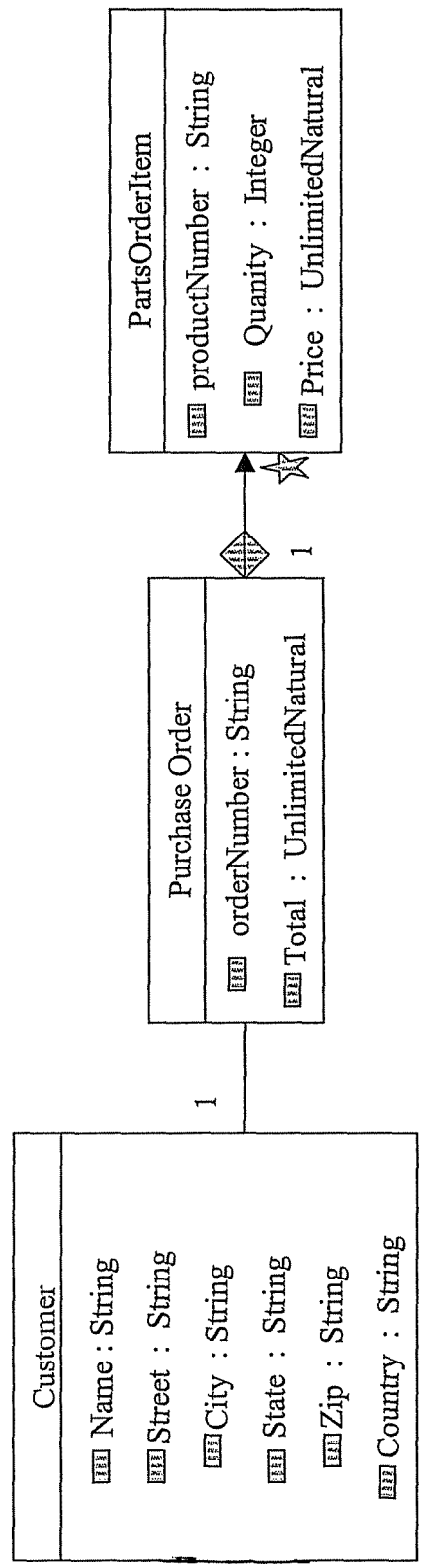
FIG. 12 illustrates one example of a data structure.

In the application model, the data structure used in the service is defined. For the notation of the data structure, the class diagram of the UML and Business Object definition diagram of the IBM WebSphere Integration Developer can be used. Referring to FIG. 12, for example, by using the class diagram of the UML, the data structure can be defined like it is in FIG. 12.

When such a data structure definition exists, introduce the security requirement for data, which is the object of the Compliance Rule. In this embodiment, it is assumed that customer data, which is the object of the Compliance Rule, is defined as a classCustomer.

Based on the order relation regarding the Integrity and Confidentiality, which is decided by the method for abstraction of the above mentioned security policy, and the Compliance Rule, the Security Designer decides the security requirement for the data (classCustomer) led by the Compliance Rule that corresponds to which order, in this embodiment, the above mentioned security policy SP2 and SP3 is subject to the encryption by AES-256, and all of SP1, SP2, and SP3 use SHA-256 as the message digest function for the signature. Consequently, the security requirement for data (classCustomer) led by the Compliance Rule can be expressed, for example, as shown in FIG. 14.

Figure 13:
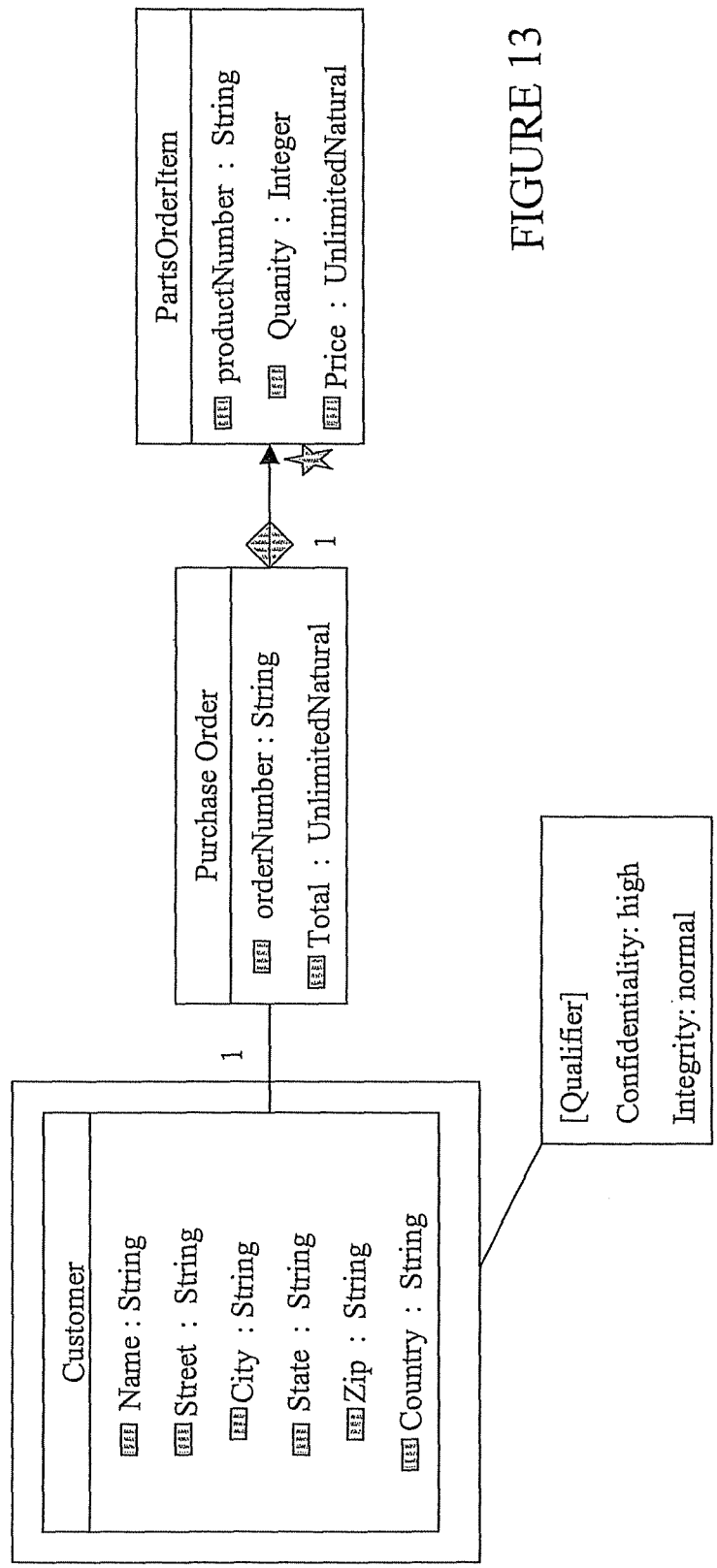
FIG. 13 illustrates one example of a security requirement.

When giving that as the Security Qualifier for the UML class diagram of FIG. 12, it is possible to express it like FIG. 13. In FIG. 13, the Security Qualifier is given to the customer class Customer, that is the orderer, and the object (that is, data), which is the instance of the Customer class, requires to be treated under the Security Qualifier, among any services in which it may be delivered.

Based on the above information, the consistency among security requests is verified. It is verified for each Confidentiality and Integrity.

(A) Verification of Confidentiality: Verify according to the following procedure.
 (1) Start from the starting point of the process flow. Take out the Confidentiality in the Security Qualifier given to each argument of the operation corresponding to the starting point.
 (2) Obtain the requirement for the Confidentiality corresponding to each processing along the control flow. When obtaining a requirement, which is lower than that of the Confidentiality already obtained regarding a variable, the verification is completed with the above being an inconsistency. When passing through all routes of the process flow to reach the final point and no inconsistency was detected until then, the consistency of the security requirement is reported as a verification result.
  (a) A constant value gives a minimum Confidentiality.
  (b) When using data, to which the security requirement is given, give the variable storing the data the security requirement (Confidentiality) of the data. If the security requirement (Confidentiality) is already given to the variable and it is lower than the Confidentiality of the data, detect the inconsistency.
  (c) When the variable is modeled by the complex type and class and accesses their member data, the Confidentiality of the member data takes over the Confidentiality of the original variable.
  (d) The Confidentiality of the equation is the largest of that of each variable and data comprising the equation.
  (e) When there is a substitution for the variable, if the Confidentiality of the variable is lower than that of the equation to be substituted, the inconsistency is detected.
  (f) A call of the operation of other services is considered as a substitution for the argument of the operation. Further, the verification of the Confidentiality regarding the operation is performed by using the process flow regarding the operation.
  (g) Regarding a conditional branching, when the Confidentiality of a variable substituted at a branching is lower than the Confidentiality of a conditional equation, the inconsistency is detected.
  (h) Regarding a repetition, when the Confidentiality of a variable substituted in a repetitive processing is lower than that of a repetitive conditional equation, the inconsistency is detected.

(B) Verification of Integrity; Verify according to the following procedure. The procedure is almost the same as that of (A), although, procedure (2)-(a), (d), (g), and (h) are different.
 (1) Start from the starting point of the process flow. Take out the Integrity in the Security Qualifier given to each argument of the operation corresponding to the starting point.
 (2) Obtain the requirement for the Integrity corresponding to each processing along the control flow. When obtaining a requirement, which is lower than that of the Integrity already obtained regarding a variable, the verification is completed with the above being an inconsistency. When passing through all routes of the process flow to reach the final point and no inconsistency is detected until then, the consistency of the security requirement is reported as a verification result.
  (a) A constant value gives a minimum Integrity.
  (b) When using data, to which the security requirement is given, give the variable storing the date the security requirement (Integrity) of the data. If the security requirement (Integrity) is already given to the variable and it is lower than the Integrity of the data, the inconsistency is detected.
- (c) When the variable is modeled by the complex type and class and accesses their member data, the Integrity of the member data takes over the Integrity of the original variable.
- (d) The Integrity of the equation is the smallest of that of each variable and data comprising the equation.
- (e) When there is a substitution for the variable, if the Integrity of the variable is lower than that of the equation to be substituted, the inconsistency is detected.
- (f) A call of the operation of other services is considered as a substitution for the argument of the operation. Further, the verification of the Integrity regarding the operation is performed by using the process flow regarding the operation.
- (g) Regarding a conditional branching, when the integrity of a variable substituted at a branching is higher than the Integrity of the conditional equation, the inconsistency is detected.
- (h) Regarding a repetition, when the Integrity of a variable substituted in a repetitive processing is higher than that of the repetitive conditional equation, the inconsistency is detected.

Figure 15:
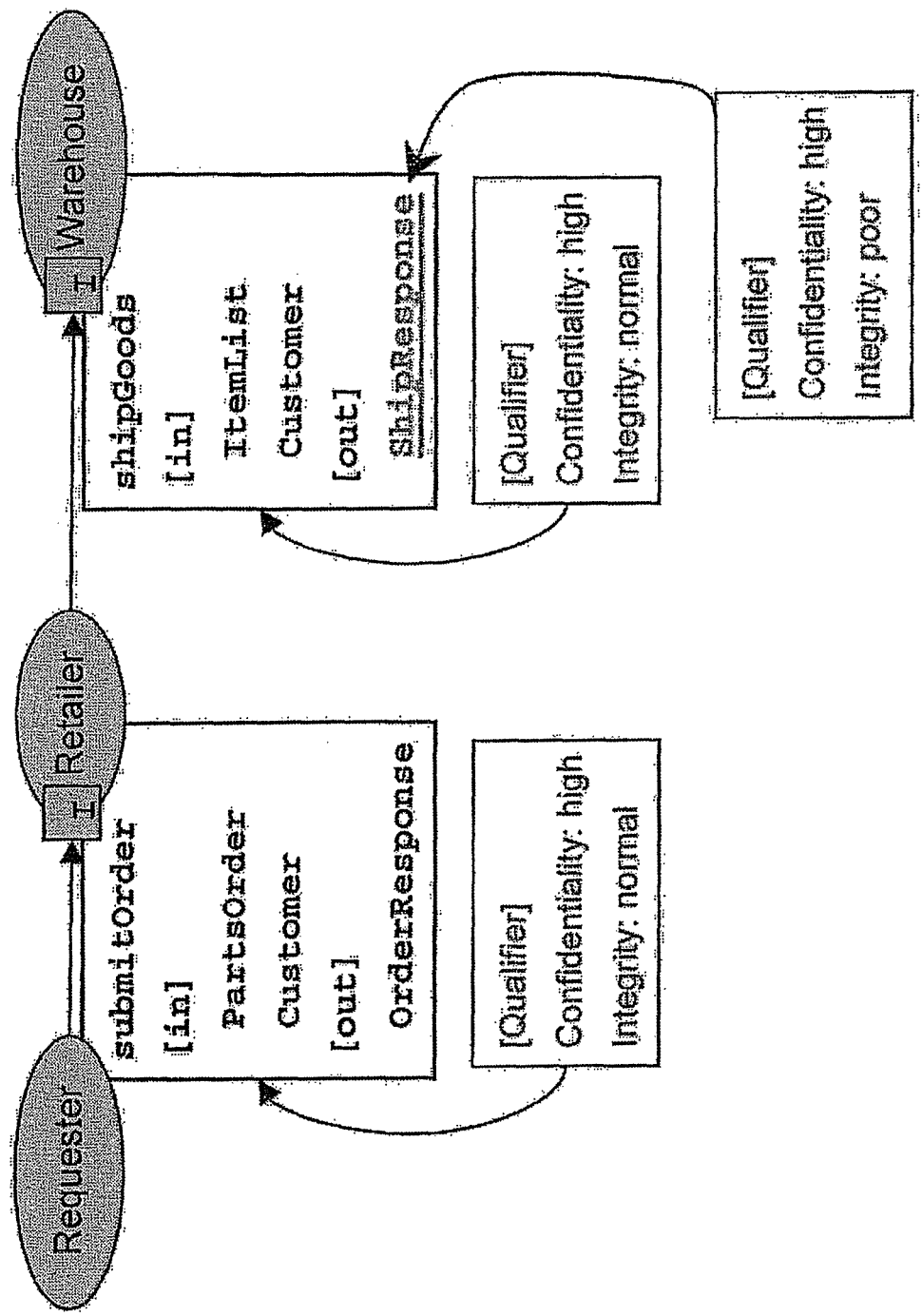
FIG. 15 illustrates one example of an output argument.

For example, when verifying according to the above-mentioned procedure based on the application model and security requirement, the verification succeeds for both Confidentiality and Integrity. That is the security requirement is consistent. Here, if it is assumed that the Integrity of the output argument ShipResponse of the operation shipGoods of the service Warehouse example is changed to be not normal, but to be poor, it becomes like FIG. 15.

The verification is illustrated in the following example. From (B)-(2)-(d), the Integrity of the conditional equation "ShipResponse.quantity>=PartsOrder.quantity" of the conditional branching (AllShipped) in the process flow becomes poor. On the other hand, in the assign statement "OrderResponse.quantity←PartsOrder.quantity" and "OrderResponse.quantity←0" at each branching, the Integrity of the substituted variable OrderResponse.quantity is normal. Consequently, the inconsistency is detected by (B)-(2)-(g). The inconsistency means that since the requirement of the Integrity for the output (ShipResponse) of the shipGoods is low, there is a risk of falsification, and when the falsification occurs, there is a possibility that the value of the OrderResponse.quantity is effected because there is a possibility that a false branching may be executed due to the falsification.

Figure 16:
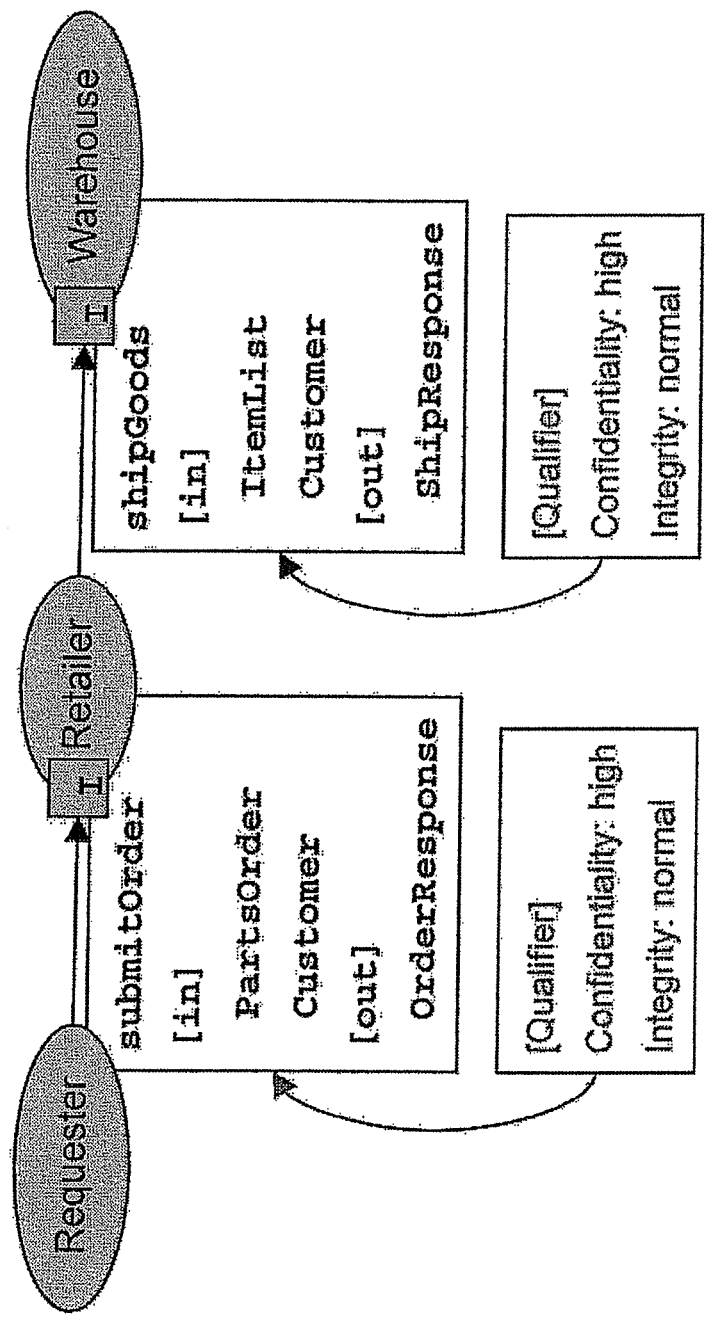
FIG. 16 illustrates one example of an inconsistency.

Further, when it is assumed that for the interface of the service Retailer and service Warehouse, not SP2 but SP1 is given as the security policy, the corresponding Security Qualifier for that is changed from:

[Qualifier]
Confidentiality: high
Integrity: normal
of SP2 to
[Qualifier]
Confidentiality: low
Integrity: strong
of SP1. Thus, FIG. 16 is obtained.

The verification is as follows, from FIG. 14 and (A)-(2)0 (b), the Confidentiality of the class Customer is high. The object of the Customer is given to the argument Customer of the operation submitOrder of the service Retailer and the argument Customer of the operation shipGoods of the service Warehouse. Consequently, it is a substitution for the variable, which is given a low Confidentiality (low) by (A)-(2)-(f) and (a), so that the inconsistency is detected.

Figure 17:
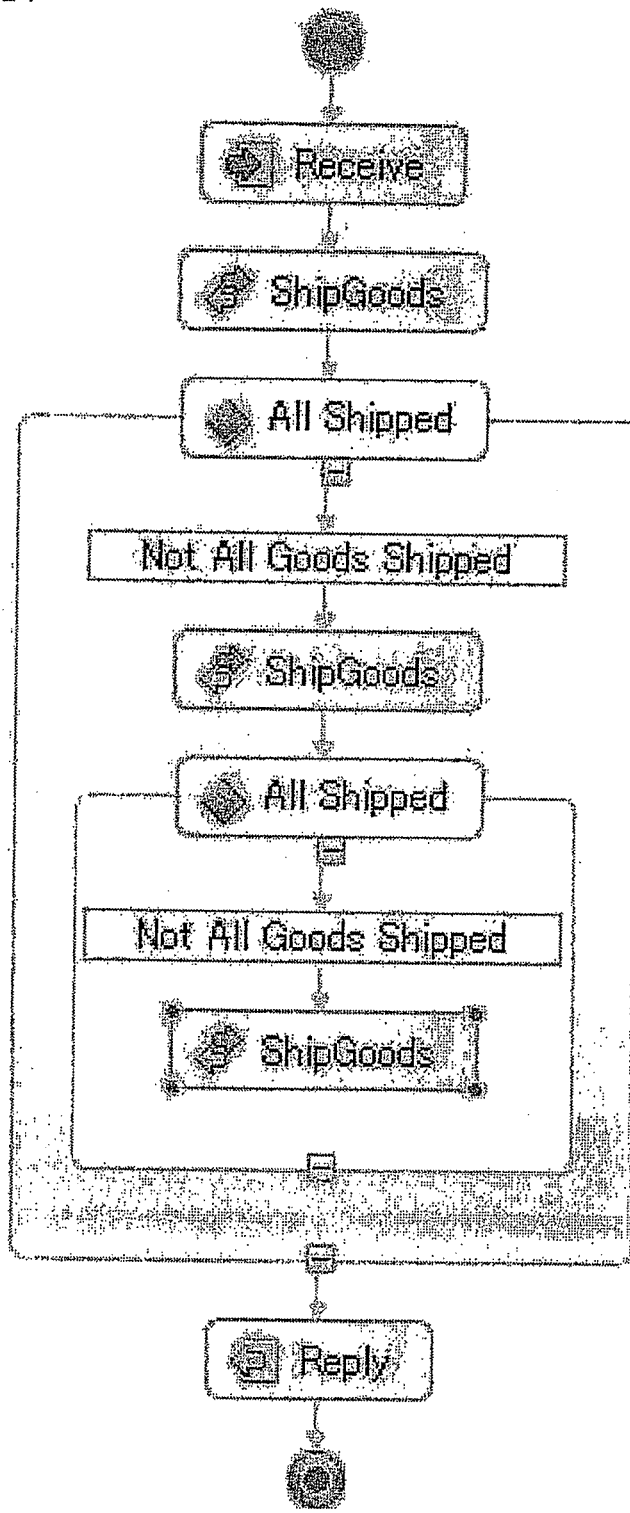
FIG. 17 illustrates one example of a process flow in accordance with the disclosed method of FIG. 1.

The process flow diagram defined by the BPEL is shown m FIG. 17. The security requirement for data can be given in tire class diagram of the UML by using a stereotype.

With the present invention, it is possible to verify whether the security policy is consistent or not in the application model in the Web service composition. Thus, the possibility of the service composition can be judged not only by the functional requirement, but also by the non-functional requirement, and further the consistency with the Compliance Rule can also be judged. Because these verifications of the consistency become possible, a deeper reuse of existing services and a composition of complicated services become easy.

While the preferred embodiment to the invention has been described, it will be understood that those skilled in the art, both now and in the future, may make various improvements and enhancements which fall within the scope of the claims which, follow. These claims should be construed to maintain the proper protection for the invention first described.

What is claimed is:

1. A computer implemented method for model based verification of security policies for web service composition, comprising:
    obtaining an abstracted security qualifier, the abstracted security qualifier abstracted by mapping a security policy to a security qualifier, the security qualifier comprising a plurality of ordered security levels including a confidentiality attribute and an integrity attribute, the security levels representing an intensity of protection associated with each security policy requirement, the abstracted security qualifier maintaining the order and strength of the security level;
    presenting the abstracted security qualifier to an application model, the abstracted security qualifier being presented to the application model as a first data security requirement, the first data security requirement comprising confidentiality requirements of the data, and extracted from the abstracted security qualifier;
    extracting a second data security requirement from a compliance rule in the web service, the compliance rule comprising security requirements and a policy for the transmission of data, the second data security requirement associated to data utilized in the web service from a compliance rule, the second security requirement comprising integrity requirements of the data;
    processing flow in the application model, on the computer, such processing based upon the integrity requirements of the second data security requirement; and
    verifying, on the computer, a consistency between the first data security requirement and the second data security requirement in response to the processing flow.

2. The method as set forth in claim 1, wherein the information flow analysis is part of a system structure.

3. The method as set forth in claim 2, wherein the security qualifier is abstracted from a security policy on a message protection member.

4. The method as set forth in claim 3, wherein the security qualifier is abstracted for at least one of, (i) each argument in a service, and (ii) each service.

* * * * *